United States Patent
Kumta

(10) Patent No.: US 12,401,022 B2
(45) Date of Patent: Aug. 26, 2025

(54) METHODS OF FABRICATION OF ENGINEERED CARBON NANOFIBER/Cu ELECTRODE ARCHITECTURES FOR DENDRITE-FREE HIGH EFFICIENCY Li METAL BATTERIES

(71) Applicant: UNIVERSITY OF PITTSBURGH—OF THE COMMONWEALTH SYSTEM OF HIGHER EDUCATION, Pittsburgh, PA (US)

(72) Inventor: Prashant N. Kumta, Pittsburgh, PA (US)

(73) Assignee: UNIVERSITY OF PITTSBURGH—OF THE COMMONWEALTH SYSTEM OF HIGHER EDUCATION, Pittsburgh, PA (US)

( * ) Notice: Subject to any disclaimer, the term of this patent is extended or adjusted under 35 U.S.C. 154(b) by 549 days.

(21) Appl. No.: 17/773,725

(22) PCT Filed: Nov. 4, 2020

(86) PCT No.: PCT/US2020/058776
§ 371 (c)(1),
(2) Date: May 2, 2022

(87) PCT Pub. No.: WO2021/091934
PCT Pub. Date: May 14, 2021

(65) Prior Publication Data
US 2022/0376232 A1  Nov. 24, 2022

Related U.S. Application Data
(60) Provisional application No. 62/930,100, filed on Nov. 4, 2019.

(51) Int. Cl.
*H01M 4/36* (2006.01)
*H01M 4/04* (2006.01)
(Continued)

(52) U.S. Cl.
CPC ......... *H01M 4/366* (2013.01); *H01M 4/0471* (2013.01); *H01M 4/625* (2013.01); *H01M 4/661* (2013.01); *H01M 10/0525* (2013.01)

(58) Field of Classification Search
None
See application file for complete search history.

(56) References Cited

U.S. PATENT DOCUMENTS

2014/0377650 A1   12/2014   Tiquet et al.
2015/0236343 A1    8/2015   Xiao et al.
(Continued)

OTHER PUBLICATIONS

International Search Report and Written Opinion Issued in PCT/US2020/058776 Dated Mar. 22, 2021.

*Primary Examiner* — Wyatt P McConnell
(74) *Attorney, Agent, or Firm* — Carol A. Marmo; Eckert Seamans Cherin & Mellott, LLC

(57) ABSTRACT

The inventive concepts include at least an electrode architecture including a composite structure that includes engineered carbon nanofibers, a lithium-impervious elastic polymer, a copper collector and a lithium-containing cathode; dendrite-free, lithium metal-plated anode that includes the electrode architecture; and a lithium metal-based lithium ion battery that includes the lithium metal-plated anode, liquid and solid electrolytes and a lithium-free cathode.

12 Claims, 15 Drawing Sheets

(51) Int. Cl.
*H01M 4/62* (2006.01)
*H01M 4/66* (2006.01)
*H01M 10/0525* (2010.01)

(56) References Cited

U.S. PATENT DOCUMENTS

2018/0130978 A1 5/2018 Roy et al.
2018/0294476 A1* 10/2018 Zhamu .................. H01M 4/382

* cited by examiner c) Insulated coin cell Testing a)

Loss of electrical contact and lift off of CNF
Reduction in probability of plating on CNF with repeated cycling b) CNF on Cu without PDMS in architecture a) Long Term Testing

- Counter/Reference – Lithium foil, Insulated Coincell
- Electrolyte = 1M LiPF$_6$ EC:DEC:FEC
- Formation cycle = 3 cycles @ 25mA/g, 0.01V – 1.2V
- Active Material loading = 2 – 3 mg/cm$^2$

METHODS OF FABRICATION OF ENGINEERED CARBON NANOFIBER/Cu ELECTRODE ARCHITECTURES FOR DENDRITE-FREE HIGH EFFICIENCY Li METAL BATTERIES

CROSS-REFERENCE TO RELATED APPLICATION

This application is a U.S. National Stage Application under 35 U.S.C. § 371 of International Patent Application No. PCT/US2020/058776, filed on Nov. 4, 2020, entitled "METHODS OF FABRICATION OF ENGINEERED CARBON NANOFIBER/CU ELECTRODE ARCHITECTURES FOR DENDRITE-FREE HIGH EFFICIENCY LI METAL BATTERIES", which claims priority under 35 U.S.C. § 119(e) from U.S. Provisional Patent Application No. 62/930,100, entitled "METHODS OF FABRICATION OF ENGINEERED CARBON NANOFIBER/Cu ELECTRODE ARCHITECTURES FOR DENDRITE-FREE HIGH EFFICIENCY Li METAL BATTERIES", filed on Nov. 4, 2019, the contents of which are incorporated herein by reference.

GOVERNMENT SUPPORT

This invention was made with government support under DE-EE0007797 awarded by the U.S. Department of Energy. The government has certain rights in the invention.

FIELD OF THE INVENTION

The present invention relates to novel electrode architectures for dendrite-free high efficiency lithium metal batteries, e.g., lithium metal-based lithium ion batteries. The electrode architectures include carbon nanofiber/a lithium-impervious, elastic polymer/metal substrate or current collector.

BACKGROUND OF THE INVENTION

Traditional lithium ion batteries employ graphite- or carbon-based anodes and cathodes including layered transition metal oxides or spinel compounds. These systems rely largely on the intercalation concept of Li ions inserting and shuttling reversibly between the two electrodes. In order to pursue higher energy density, alternative systems of Li—S and Li-air are being pursued in the art. These systems rely on the use of Li metal as the anode wherein the Li metal is plated during discharge and de-plated during charge. Lithium metal plating-deplating/electrochemical deposition is often associated with formation and growth of high surface area, mossy growth of lithium and eventually resulting in dendritic growth of lithium. The first two plating morphologies are often associated with low columbic efficiency of plating (<90% depending on the electrolyte used) due to the high surface area available, which results in the formation of electrically insulating solid electrolyte interphase (SEI) layer. Most of the lithium ion batteries typically employing Li metal plating fail before reaching the stage of dendrite formation, both due to an increase in internal impedance, low columbic efficiency and internal shorting caused by these morphologies compounded with dendrite growth and migration related cell shorting.

Dendrite formation in electrochemical systems occurs due to inhomogeneous current densities coupled with local diffusion gradients, surface roughness, interfacial reactions between the depositing Li ion and the current collector substrate, contact angle of the nucleating lithium metal and the consequent resulting kinetically induced perturbation and surface roughening. Control and elimination of lithium-metal dendrite formation could render universal adoption of Li-anode in high energy density Li-ion batteries for stationary, portable, and mobile applications. The lithium plating on Cu foil used as the archetypical current collector in batteries fail within 30-50 cycles exhibiting a low Coulombic efficiency of (<90%) when tested in practically/scientifically appropriate electrochemical testing scenario.

Further, there are probable issues with standard testing conditions and analysis in Li plating. For instance, the traditionally employed current coin cell testing for performance study of Li—Cu systems includes potential issues, as follows:

i) Use of smaller reference Li as compared to working electrode to prevent Li plating on the stainless components of the coin cell;

ii) The systems show an initial high Coulombic efficiency (CE) region of 40-70 cycles depending on the loading and areal current density applied after which the CE becomes erratic, unstable or decreases rapidly;

iii) This happens due to spreading of plated Li on both the working electrode and the stainless steel behind the Li reference; the actual areal current density in the electrochemical system therefore varies with the number of cycles;

iv) Hence, the system shows a false anomalous result as well as is subject to inaccurate depiction due to variable areal current density; and v) Consequently, any coating method further creates resistance to Li flux and an increase in spreading of lithium showing an anomalous compounded stable cycling region (on the order of 3-5 times).

Thus, there is a need in the art to design and develop novel electrode architectures, methods of making these architectures and using them in dendrite-free high efficiency lithium metal batteries (LMBs), and methods of testing and analyzing performance in Li plating.

SUMMARY OF THE INVENTION

An object of the present invention is to develop novel electrode architectures for use in lithium metal batteries (LMBs). In one aspect, the invention provides an electrode architecture that includes a multi-layer composite structure including a metal-based substrate to form a first layer; a lithium-impervious, elastic polymer applied to or deposited onto the metal-based substrate to form a second layer; carbon nanofibers applied to or deposited onto the lithium-impervious, elastic polymer to form a third layer; and a point of contact maintained by the carbon nanofiber in direct contact with the metal-based substrate through the lithium-impervious, elastic polymer.

The carbon nanofibers can include a plurality of carbon nanofibers in a mat form. The mat can be generated by electrospinning followed by subsequent thermal treatment.

In certain embodiments, the lithium-impervious, elastic polymer is polydimethylsiloxane. The metal-based substrate can be a copper collector comprising copper foil. The lithium-impervious, elastic polymer can be applied to a surface of the metal-based substrate, and the carbon nanofiber mat can be pressed onto an outer or exposed surface of the lithium-impervious, elastic polymer to maintain the point of contact with the metal-based substrate.

A dendrite-free, lithium metal-plated anode, can include the electrode architecture, wherein the engineered carbon nanofiber of the electrode architecture exhibits good wetting, acceptable contact angle ($0 \leq \theta < 90$) and interfacial adhesion characteristics to metallic lithium preventing the formation of dendrites.

In another aspect, the invention includes a lithium metal-based lithium ion battery including a dendrite-free lithium metal-plated anode including a multi-layer composite structure including carbon nanofibers; a lithium-impervious, elastic polymer; a metal-based substrate; and a point of contact maintained by the carbon nanofibers in direct contact with the metal-based substrate through the lithium-impervious, elastic polymer; liquid and solid electrolytes; and a cathode selected from the group consisting of a lithium-free cathode and a lithium-containing cathode.

In another aspect, the invention provides a method of preparing an electrode architecture. The method includes constructing a multi-layer composite structure including forming a first layer comprising a metal-based substrate; forming a second layer comprising a lithium-impervious, elastic polymer; applying or depositing the second layer onto the first layer; forming a third layer comprising carbon nanofibers; applying or depositing the third layer onto the second layer; and maintaining a direct point of contact by the third layer directly contacting with the first layer through the second layer.

In still another aspect, the invention provides a method of testing an electrode architecture. The method includes providing a coin cell metal-based substrate having a length; providing a working electrode metal-based substrate having a length that is less than the length of the coin cell metal-based substrate; placing the working electrode metal-based substrate onto the coin cell metal-based substrate; applying or depositing onto the coin cell metal-based substrate a lithium-impervious, elastic polymer; positioning the lithium-impervious, elastic polymer on the portion of the length of the coin cell metal-based substrate that extends beyond the length of the working electrode metal-based substrate; and lithium plating the working electrode metal-based substrate, wherein the entire length of the coin cell metal-based substrate is protected from the lithium plating.

BRIEF DESCRIPTION OF DRAWINGS

A full understanding of the disclosed concept can be gained from the following description of the preferred embodiments when read in conjunction with the accompanying drawings.

DETAILED DESCRIPTION OF THE INVENTION

The invention relates to novel electrode architectures that include composite structures, dendrite-free lithium (Li)-plated anodes, and lithium (Li) ion, metal-based batteries. Further, a three-electrode system for Li plating/deplating has been developed, as well as an improved coin cell testing system for Li plating/deplating.

A dendrite-free, lithium metal-plated anode, can include an electrode architecture, wherein an engineered carbon nanofiber of the electrode architecture exhibits good wetting, acceptable contact angle ($0 \leq \theta < 90$) and interfacial adhesion characteristics to metallic lithium preventing the formation of dendrites.

In accordance with the invention, the novel electrode architectures include carbon nanofibers (CNF), such as but not limited to a CNF mat including a plurality of woven or non-woven carbon nanofibers, with the use of an elastic polymer that is impervious to lithium, and a metal-based substrate or current collector, such as but not limited to copper (Cu), e.g., Cu foil, which is traditionally employed in Li-ion batteries.

Suitable elastic polymers for use in the invention include those elastic polymers that are impervious to lithium, such as, but not limited to silicone-based polymers, carbon-based polymers (hydrocarbon polymers), higher valence (greater than 3) metal and oxygen-backbone based hydrocarbon polymers, higher valence (greater than 3) metal and phosphorus-backbone based hydrocarbon polymers, higher valence (greater than 3) metal and sulfur-backbone based hydrocarbon polymers, any trivalent, tetravalent, pentavalent and higher valence state coordinated metal backbone based hydrocarbon polymers and mixtures or blends thereof. In certain embodiments, the lithium-impervious, elastic polymer is polydimethylsiloxane (PDMS).

Without intending to be bound by any particular theory, it is believed that the current collector (or charge carrier) is a structure within an electrode (e.g., a battery electrode) that provides a path for an electric current flowing to or from the active material. Suitable substrates for use in the invention include, but are not limited to, for example, nickel, platinum, palladium, rhodium, silver, gold, copper, manganese, chromium, stainless steel, tantalum, titanium, Inconel, and mixtures thereof. In certain embodiments, the substrate is a copper-based current collector, e.g., copper foil, traditionally used in Li-ion batteries. Copper is a relatively inexpensive material and therefore, may produce a low cost composite for use, for example, in a lithium ion battery, in accordance with the invention.

Figure 5A:
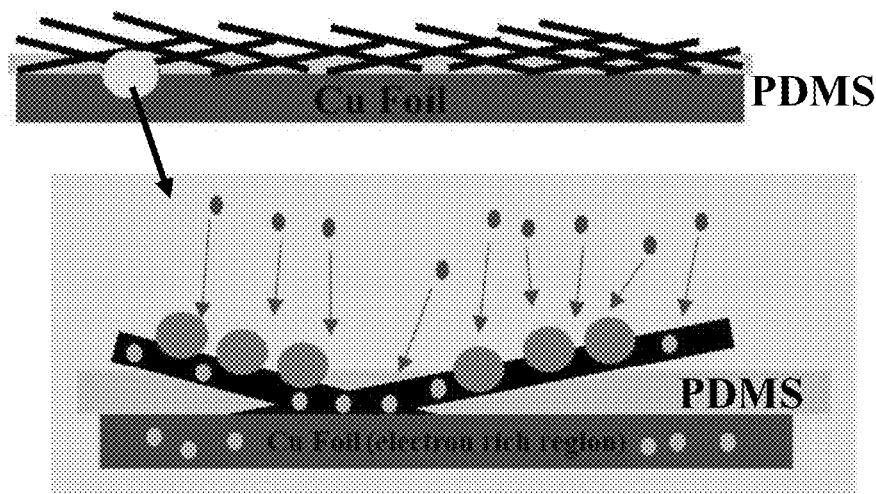
FIG. 5a is a schematic that shows expected plating behavior in the CNF/PDMS-Cu architecture and FIG. 5b is a plot of the electrochemical response of CNF without the electrode architecture, in accordance with certain embodiments of the invention.

The electrode architectures are in the form of a multi-layer or multi-coating composite structure. The electrode architectures form a stacked configuration. In certain embodiments, the metal-based substrate or current collector forms a first layer or coating, the Li-impervious, elastic polymer deposited onto or applied to a surface of the metal-based substrate or current collector forms a second layer or coating, and the CNF deposited on or applied to an outer or exposed surface of the Li-impervious, elastic polymer forms a third layer or coating. Application of the CNF, for example, in the form of a mat, includes carefully placing or pressing it, by applying pressure or a force, onto the surface of the Li-impervious, elastic polymer. The Li-impervious, elastic polymer is positioned between the metal-based current collector and the CNF. There is at least one point of contact wherein the CNF directly contacts the metal-based current collector, through the Li-impervious, elastic polymer. The entire or full surface of the CNF does not directly contact the metal-based current collector; according to the invention, there are one or more points of contact where the CNF extends through the thickness of the Li-impervious, elastic layer such as to be in direct contact with the metal-based current collector. The engineered point (s) of contact is/are maintained by the CNF with the metal-based current collector or substrate through the Li-impervious and elastic polymer. Full surface, direct contact of the CNF with the metal-based current collector is not necessary; the one or more points of contact maintained between the CNF and metal-based current collector are effective during cycling. FIG. 5a is a schematic that shows a Cu foil current collector with a layer of PDMS applied or deposited onto the Cu foil, and CNF applied or deposited onto the layer of PDMS to form a 3-layer stacked configuration. A detailed schematic view of the Cu foil, PDMS and CNF interfaces shows a portion of the CNF, e.g., a point of contact, where the CNF is in direct contact with the Cu foil through the layer of PDMS. The lithium ions (larger spherical shapes) positioned on the CNF (black rods) demonstrates that lithium plating is focused or concentrated on the CNF, and precludes or prevents Li electrolyte contact with, and lithium plating directly onto, the Cu foil. This architecture and the presence of the elastic polymer, which is impervious to lithium, provides for no loss of the desired electrical contact and prevents any lift-off of the CNF from the current collector or substrate, that in turn prevents Li plating directly onto the current collector or substrate, thereby focusing the lithium flux onto the CNF only. As a result, directed plating of Li on the CNF is ensured rather than direct plating on the current collector.

Figure 4A:
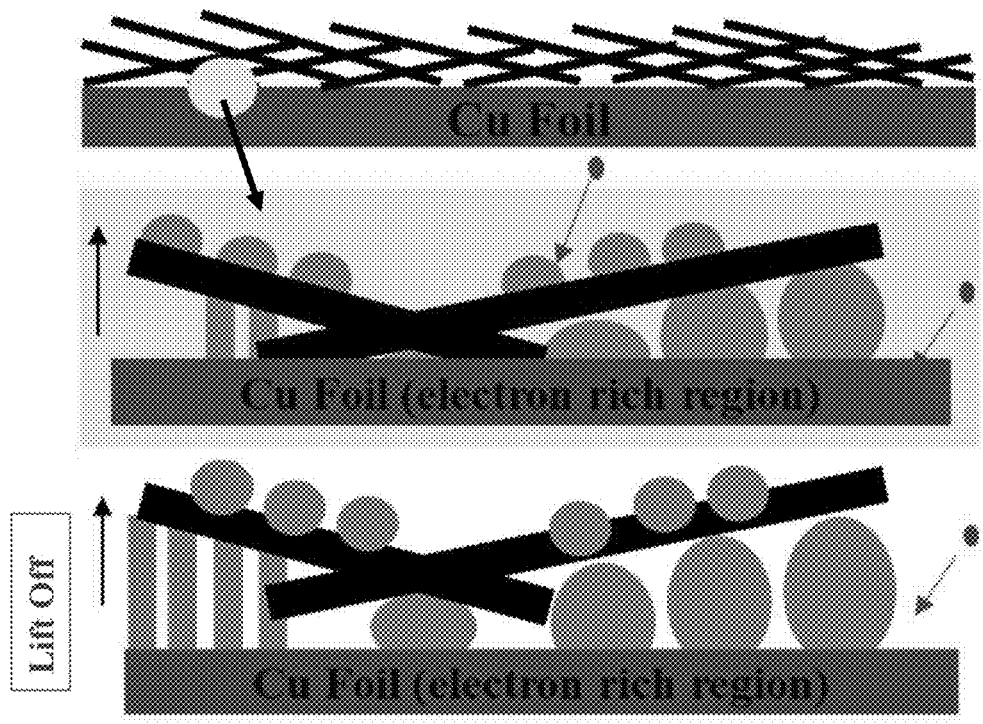
FIG. 4a is a schematic that shows expected plating behavior in the CNF on Cu architecture and FIG. 4b is a plot of the electrochemical response of CNF without the electrode architecture, in accordance with certain embodiments of the invention.

In contrast, FIG. 4a is a schematic that shows a Cu foil current collector with CNF applied or deposited directly onto the Cu foil corrector, without a PDMS layer, to form a 2-layer stacked configuration. A detailed schematic view of the Cu foil and CNF interface shows (that with cycling, in the absence of the PDMS layer) the CNF lifts off from the surface of the Cu foil current collector. The lithium ions (larger spherical shapes) are formed/positioned on the CNF (black rods) and on the Cu foil current collector. As a result, the lithium plating occurs on both the CNF and the Cu foil current collector. The lithium plating is not focused on the CNF nor precluded from occurring on the Cu foil current collector (as shown in FIG. 5a) for the Cu foil/PDMS/CNF architecture. The lithium plating directly on the Cu foil current forms an interfacial layer of Li (larger oval shapes) for the Cu foil/CNF architecture. The formation of dendrites therefore occurs due to lithium plating directly on the Cu foil current collector, which can result in a reduced probability of Li plating only on CNF with repeated cycling, and thereby consequent ultimate failure of the composite.

Methods of preparing the electrode architectures according to the invention include constructing a multi-layer, multi-film or multi-coating composite structure, which includes forming a first layer comprising a metal-based substrate; forming a second layer comprising an elastic polymer that is impervious to lithium; applying or depositing the second layer onto the first layer; forming a third layer comprising carbon nanofibers (CNF); applying or depositing the third layer onto an outer or exposed surface of the second layer; and forming/maintaining a point of contact by the third layer directly with the first layer through the second layer.

In certain embodiments, a PDMS coating or layer is deposited on or applied to the surface of a Cu foil. A CNF mat is in turn applied, e.g., pressed on, to the exposed surface of the PDMS coating, to form an outer CNF surface. A point of contact is maintained by the CNF directly with the Cu foil through the PDMS. This architecture, and the presence of the PDMS provides for no loss of the desired electrical contact, preventing the lift-off of CNF from the Cu foil, preventing Li plating on the Cu foil, thus focusing lithium flux only on the CNF, and consequently ensuring directed plating of Li on the CNF rather than on the current collector.

The novel engineered CNF—with a Li-impervious, elastic polymer, such as PDMS, and metal-based substrate or current collector, such as Cu foil, i.e., (CNF—PDMS/Cu) architecture, has been found by the inventors to exhibit a Columbic efficiency (CE) of ~97.8-98.7% within the first ten cycles of plating followed by CE>99.2% region at high areal current rates of 6 mA/cm$^2$ and areal charge density of 6 mAh/cm$^2$ controlled by the loading density of the carbon nanofiber. The CNF alone exhibits a stable lithium plating capacity of ~3000 mAh/g (without any initial intercalation capacity) when tested in traditional LiPF$_6$ based electrolyte. However, the inventors have found that without the CNF—PDMS/Cu architecture, accurate scientific testing of the electrochemical capacity of the CNF is virtually and practically impossible, let alone finding practical application in lithium ion batteries. Adjusting for the initial low CE region, the capacity of the CNF is 1500 mAh/g-2500 mAh/g with the Li/CNF=0.2-1 weight ratio. Currently, the system exhibits these stable capacities at gravimetric current rates of <2 A/g (areal current<6 mA/cm$^2$) with the loading of CNF=2-4 mg/cm$^2$, PDMS ~2-3 mg/cm$^2$ and utilization of commercial Cu foil for Li-ion batteries (LIBs) being 4-5 mg/cm$^2$ hence, giving a capacity of 500 mAh/g-1000 mAh/g on the basis of the entire electrode (without the electrolyte and porosity of electrodes).

The long-term cycling of the system shows stable high CE region till 600 cycles. However, for practical marketability and even for scientific purposes the claim stands at 200-300 cycles.

In contrast, current commercial graphite-based electrodes based on intercalation chemistry are restricted to 1.5-2 mAh/cm$^2$, with a capacity of 300 mAh/g with respect to graphite, 270 mAh/g with respect to slurry and ~150-200 mAh/g entire electrode. These systems operate at potentials higher than the plating regime, thus being limited in overall capacity and utilizing only one active Li per six carbon atoms. Additionally, favorable Gibbs Thomson Parameter (GTP) and interfacial adhesion energy between the Li and the carbon surface control the nucleation and growth potential, thereby enabling long term cycling of the CNF system preserving a dendrite-free structure.

The CNF-PDMS/Cu electrode architecture provides stabilization of the lithium metal plating. The carbon nanofibers are the base material for the stabilized lithium plating/deplating in lithium ion batteries utilizing Li metal plating on an anode, while implementing the use of Li-ions for intercalation and reaction on the cathode.

The carbon nanofibers are generated using various known techniques, such as but not limited to electrospinning. The electro-spinning process is typically carried out at ambient temperature and pressure conditions. The electro-spinning apparatus includes a syringe pump and a rotating drum. The syringe pump includes a syringe containing an electro-spinable solution, such as a polymer component dissolved in solvent, e.g., a polymer molten mass. A spinning capillary is located at the tip of the syringe, which is coupled with the pole of a voltage-generating arrangement (current supply). By means of an injection pump, the solution is transported out of the syringe towards the spinning capillary, where drops are formed at the tip. The surface tension of the drop of the solution coming out of the spinning capillary is overcome by means of an electric field between the spinning capillary and a counter electrode. The drop injected by the syringe coming out of the spinning capillary deforms and when it reaches a critical electric potential it is drawn to yield a fine filament, a so-called jet. This electrically-charged jet, continuously extracting new solution from the spinning capillary, is then accelerated in the electric field towards the counter electrode. The jet solidifies during its flight towards the counter electrode by means of the evaporation of the solvent or by means of cooling, such that in a short period of time continuous nanofibers are generated, linked with one another, with typical diameters of a few nanometers to several micrometers. These nanofibers are deposited on the rotating drum, which includes a roller. A conductive substrate is positioned onto the roller, such that the substrate rotates thereon. The conductive substrate is selected from materials known in the art, such as, but not limited to aluminum foil and copper foil. The syringe pump deposits the solution onto the conductive substrate as the roller is rotated. The rotating, conductive substrate serves as a collector and is grounded. The conductive substrate is removed from the rotating drum to form a nanofiber mat.

The nanofibers can have lengths as short as a few inches to as long as several feet as desired and dictated by the volume of the spinning solution and the applied potential bias forming a flexible and pliable form. The nanofiber surfaces produced can exhibit a smooth or irregular surface topography depending on the nature of the bias and the viscosity of the spinning solution.

The polymer component is selected from a variety of known polymers. Non-limiting examples of suitable polymers include known electrically conducting polymers, such as, but not limited to, polystyrene, polyaniline, polythiophene, polypyrrole, polyacrylamide, polyacrylonitrile, polyvinylidene fluoride, and others selected from a family of nitriles, amines, amides, and ethers, with functional groups selected from oxygen, fluorine, sulfur, selenium, tellurium, phosphorus and nitrogen, and mixtures thereof. In certain embodiments, the polymer component is polyacrylonitrile.

The polymer component can further include other known organic, inorganic or metal materials, and mixtures thereof. It is known in the art to include graphene in the polymer component to enhance the electronic conductivity. In certain embodiments, the polymer component for the invention excludes graphene, i.e., the polymer component is graphene-free.

The solvent is selected from known solvents, such as, but not limited to, carbon disulfide and N,N dimethyl formamide. In certain embodiments, the solvent is N,N dimethyl formamide.

The electro-spun fibers can be interconnected to form a carbon nanofiber web or mat. As mentioned, the diameters of the fibers can vary and in certain embodiments, can be from about 10 nanometers to about 100 microns. In certain embodiments, the electro-spun fibers are from 1-7 μm. The individual carbon nanofibers in the mat, e.g., nonwoven mat, can have a random orientation or can be predominantly oriented in one or more directions.

In accordance with certain embodiments of the invention, electro-spun carbon nano-fiber composites, e.g., mats, can be prepared as follows:
  i) Dissolving polymer, wherein suitable polymers include known conducting polymers, such as, but not limited to, polystyrene, polyaniline, polythiophene, polypyrrole, polyacrylamide, polyacrylonitrile, polyvinylidene fluoride, and others selected from a family of nitriles, amines, amides, and ethers, with functional groups selected from oxygen, fluorine, sulfur, selenium, tellurium, phosphorus and nitrogen, and mixtures thereof, in solvent to form a solution; and
  ii) Electro-spinning the solution into a plurality of CNF, e.g., a CNF mat, typically having diameters of a few nanometers to several micrometers (e.g., in certain embodiments, from greater than about 100 nanometers to about 10 μm) and, lengths as short as a few inches to as long as several feet (e.g., in certain embodiments, from about 12 inches to about 24 inches, as desired, and dependent on the volume of the spinning solution and the applied potential bias forming a flexible and pliable form); a surface that exhibits a smooth or irregular surface topography depending on the nature of the bias and the viscosity of the spinning solution, and depositing onto a current collector, e.g., Cu foil, which is the traditionally used current collector in Li-ion batteries.

Studying the Li plating behavior for nucleation potential using traditional coin cell testing shows nucleation potential for Cu and suppression of nucleation potential for the substrates (either surface modified or other active material substrates), for example, Zn due to large negative interfacial energy. Another probable misinterpretation arising from this, is the suppression of Li plating nucleation potential signal due to alloying and simultaneous Li plating along with alloying/reaction as in Zn and Si. Additionally, the smaller Li reference used in the system may show voltage variability due to large iR variations. Hence, there is a need for accessible testing tools and parameters to decipher the plating phenomenon.

The Sand's Time experiment provides a stable plating regime, nucleation potential, growth potential, gravimetric capacity, areal capacity, and dual channel. The three-electrode Swagelok testing provides coulombic efficiency of plating and deplating, variation of CE at different/charge current densities, and voltage profile of plating/deplating. Using a third reference electrode instead of using a two-electrode system is better for achieving a scientifically accurate result. Modified insulated coin cell testing provides comparison of electrochemical performance, coulombic efficiency of plating and de-plating, and long-term plating/de-plating study. The electrochemical testing protocol includes distinguishing electrochemical lithiation and alloying phenomenon from electrochemical plating behavior.

The three-electrode Swagelok testing includes dual channel testing. Channel A that is used to control and set the parameters for a plating and de-plating study for the working electrode carbon architecture (e.g., CNF-PDMS/Cu), and Channel B is used to monitor the voltage of the counter electrode with respect to the reference lithium. The counter electrode is replaced with Li—CNF-PDMS/Cu instead of plain Li foil to simultaneously check for voltage profile of plating/deplating when Li is melted into CNF-PDMS/Cu. In accordance with the invention, the voltage profile of CNF-PDMS/Cu (working electrode) and Li/CNF composite (counter electrode) with respect to reference Li show minimal fluctuations and stable plating and deplating, validating the reversible plating and de-plating phenomenon on the CNF-PDMS/Cu.

Figure 3A:
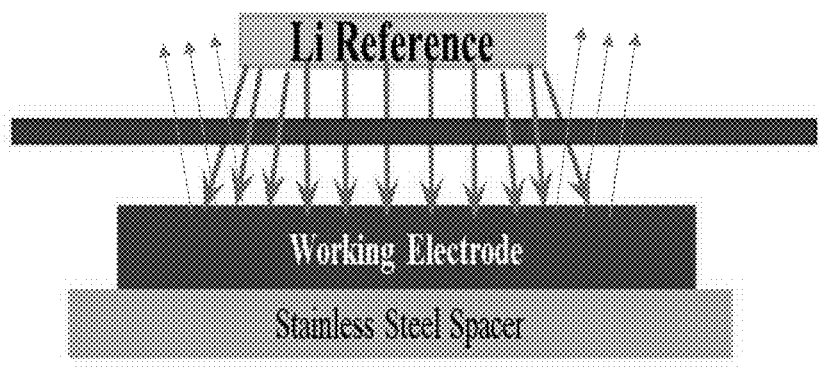
FIG. 3a is a schematic that shows traditional coin cell testing.

The inventors have found that traditional coin cell testing shows a stabilized CE region during initial plating which is due to the spread of the plated Li on the working electrode. Whereas the insulated coin cell testing focuses the Li flux directly to the working electrode and hence, the true performance of the system is recorded without exhibiting variations in actual current density, and improving the stability of reference electrode. FIG. 3a is a schematic that shows a stainless steel spacer of a coin cell with a working electrode thereon. The working electrode is a Cu foil. The length of the stainless steel spacer is greater than the length of the working electrode, such that the working electrode covers only a portion of the surface of stainless steel spacer and there is a portion of the surface of the stainless steel spacer that is not covered/protected by the working electrode. A lithium reference, e.g., lithium foil, is provided for lithium plating of the working electrode. Lithium is plated onto the Cu foil of the working electrode and in addition, onto the portion of the stainless steel spacer of the coin cell that is not covered by the working electrode and therefore, is exposed to the lithium reference. As a result the lithium plating is not directed or focused only on the working electrode, such that there is a loss of lithium plating outside of the working electrode.

Figure 3B:
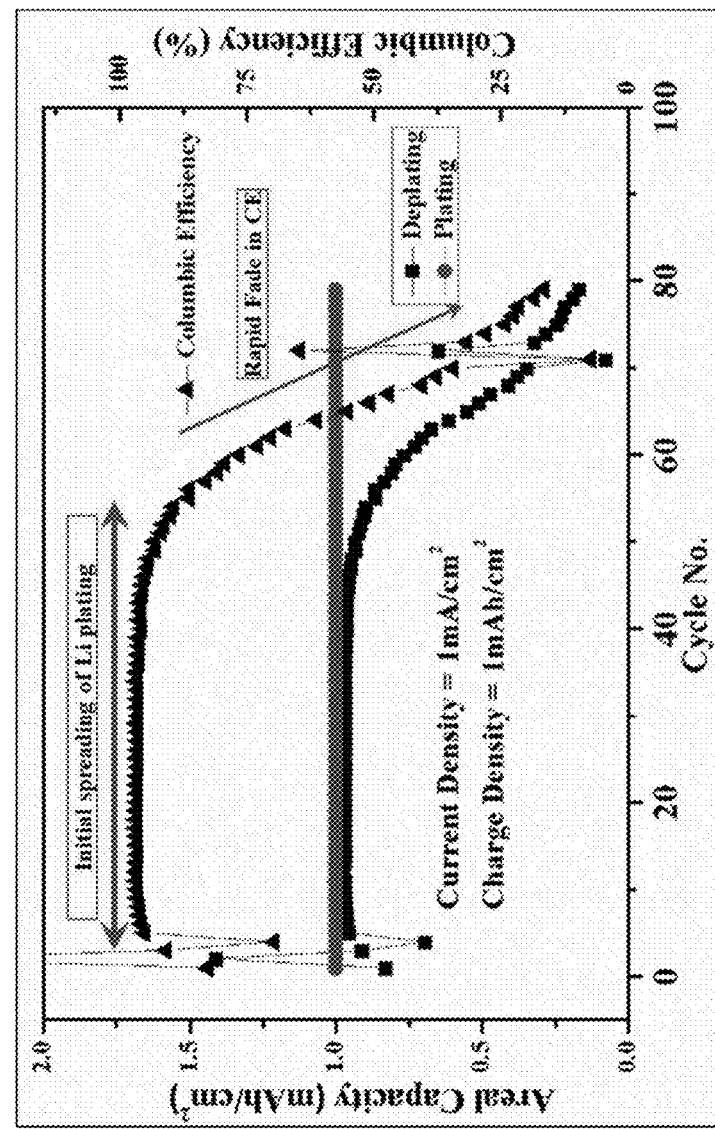
FIG. 3b is a plot that shows electrochemical response for the traditional coin cell testing.
Figure 3C:
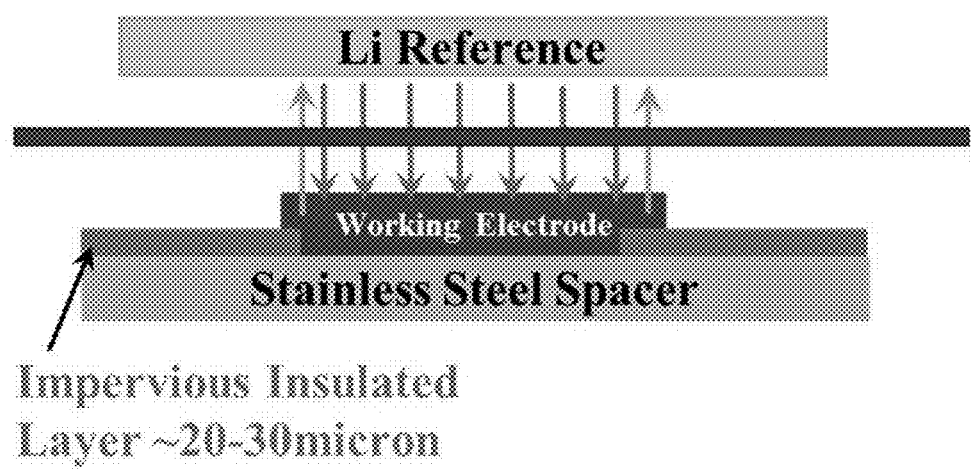
FIG. 3c is a schematic that shows insulated coin cell testing.

In contrast, in certain embodiments, the Li-impervious, elastic polymer, e.g., PDMS, is used as a blocking agent as shown in FIG. 3c. FIG. 3c is a schematic that shows a stainless steel spacer of a coin cell with a working electrode thereon; the working electrode is a Cu foil; and the length of the stainless steel spacer is greater than the length of the working electrode, such that the working electrode covers only a portion of the surface of stainless steel spacer, as shown in FIG. 3a. In FIG. 3c the portion of the surface of the stainless steel spacer that is not covered/protected by the working electrode, is covered/protected with a layer of PDMS (a Li-impervious, elastic polymer). A lithium reference, e.g., lithium foil, is provided for lithium plating of the working electrode, as shown in FIG. 3a. In FIG. 3c, the lithium is plated onto the Cu foil of the working electrode and is not plated onto the portion of the stainless steel spacer of the coin cell that is covered/protected by the layer of PDMS and therefore, the stainless steel spacer surface that is underlying the PDMS is not exposed to the lithium reference. As a result the lithium plating is directed or focused only on the working electrode, such that there is no loss of lithium plating outside of the working electrode.

According to the invention, a lithium-impervious, elastic polymer is applied to or deposited onto a portion of the coin cell (stainless steel spacer) that is not covered/protected by the working electrode and is open to lithium plating by the Li reference. The lithium-impervious, elastic polymer is used as a blocker/blocking agent in order to prevent irregular lithium plating in the coin cell and focus the flux of lithium ions to the working electrode. Additional findings include the following:

i) Electrochemical analysis of Li active material (example Si) at high current densities indicate a tendency to plate and also alloy at the same time;
ii) Traditional coin cell testing shows false and anomalous results along with variation in actual current density, which may lead to nonreplicable results in full cell system and may be subject to inaccurate reporting;
iii) A modified coin cell testing protocol has been developed and tested which prevents the spread of plated Li showcasing the actual/accurate performance of the system (allowing rapid testing/screening);
iv) Novel engineered carbon based system is developed to stabilize Li plating ensuring directed Li flux and a scientific/practically applicable testing protocol is also developed;
v) Parametric conditions and electrode configurations are developed/suggested in three electrode setup for single plating experiments;
vi) Data analysis protocol for the single plating experiments are established to convert the experimental data into practical performance parameter for electrode design;
vii) Dual channel testing protocol in three electrode Swagelok cells are developed to simultaneously monitor Li activity both on working electrode and counter electrode;
viii) Carbon based electrodes show a maximum capacity of ~3000 mAh/g for stable Li plating as per the single plating experiment;
ix) The dual channel testing protocol indicated stabilization of Li plating within 3-5 cycles after which the system shows high CE (~99.7-99.92%) with the voltage profile devoid of any nucleation overpotential;
x) The simultaneous monitoring of Li-carbon architecture shows stable voltage profile devoid of fluctuations indicating stable plating of Li infiltrated carbon-based electrode;
xi) The electrode architecture is the key component in the improved performance of the system and is established using modified coin cell testing protocol;
xii) Carbon based architecture exhibit a columbic efficiency of ~97.8-98.7% within the first 10 cycles of plating followed by CE>99.2% region at high areal current rates of 6 mA/cm$^2$ enabling an areal charge density of 6 mAh/cm$^2$;
xiii) Adjusting for the initial low CE region the capacity of the carbon-based system is 1500 mAh/g-2500 mAh/g with the Li/Carbon=0.2-1 ratio weight; and
xiv) The system exhibits these stable capacities at gravimetric current rates of <2 A/g (areal current<6 mA/cm$^2$) with the loading of carbon/active component ~2-4 mg/cm$^2$, Inactive component ~2-3 mg/cm$^2$ and the commercial Cu foil for LIBs being 4-5 mg/cm$^2$ hence, giving a capacity of 500 mAh/g-1000 mAh/g on the basis of the entire electrode (without the electrolyte in pores).

EXAMPLES

Carbon Nanofiber (CNF) by Electrospinning Process:
CNF was prepared by combining polyacrylonitrile (Sigma Aldrich): 0.8 g-1 g, and N,N Dimethyl Formamide (Sigma Aldrich): 15 ml, in a syringe of an electrospinning apparatus. The syringe was positioned such that the distance from the rotary drum of the apparatus to the tip of the syringe needle was 14-16 cm. The applied voltage was 13 KV-15 KV, and the stabilization/oxidation temperature was 240° C. for 4 hours in an air/oxygen atmosphere. The carbonization temperature was 750° C.-1000° C. for 1 hour in an argon atmosphere using a ramp rate of 1-2° C./min followed by ambient cooling.

PDMS Curing Process (Sylgard 184):

The PDMS was prepared/mixed as follows. Sylgard 184 was packaged in lot-matched kits with the base and curing agent in separate containers. The two components were mixed thoroughly using a weight or volume ratio of 10:1. The pot life is 2 hours for catalyzed Sylgard 184 at room temperature. There was applied a vacuum to de-air the system, with a residual pressure of 10-20 mm mercury, for 30 minutes to sufficiently de-air the material. The PDMS was cured in accordance with the following recommended schedules: 15 minutes at 150° C., 1 hour at 100° C., 4 hours at 65° C., 24 hours at 23° C.

Synthesis of CNF/PDMS Structure:

A CNF/PDMS structure was synthesized as follows. The PDMS (~30-50 micron) was coated on cleaned Cu foil substrate (30 minutes acetone/ethanol/isoproponal and dried in ambient conditions) using doctor blade technique. The CNF was placed on the PDMS coated copper foil and a uniaxial force of ~30 T in MTI Corp uniaxial press was applied for 24 hour. A check was conducted every 30 minutes to observe the decrease in hydraulic pressure and increasing the pressure to 30 T. The pressure was removed and the CNF-PDMS-Cu structure placed in an oven at 120° C. for 12 hours. There was a potential for the curing not to happen due to presence of impurities and behavior of PDMS.

Characterization:

The electrochemical testing of CNF was conducted in a coin cell in the voltage range of ~0.001 V to 1.2 V at a current rate of ~25 mA/g, and areal current densities of 0.1 mA/cm$^2$ and 4 mA/cm$^2$ to record the lithiation and de-lithiation behavior and performance of the CNF. The Sand's time experiment was conducted in a flooded electrolyte, two electrode cell at different current densities ranging from 1 mA/cm$^2$ to 5 mA/cm$^2$ after subjecting the electrode to ~25 mA/g current density in the positive cycle till ~0.001 V. Subsequently, the electrodes were tested in a modified coin cell using PDMS as the blocking agent to prevent irregular lithium plating in the coin cell and focus the flux of lithium ions to the electrode. Scanning electron microscopy (SEM, Philips XL 30 or Zeiss) was used to study the morphological and electrode structure. Raman spectroscopy, as applicable was performed using a Renishaw in-via Raman microscope equipped with a 633 nm red laser.

The results showed the first cycle irreversible (FIR) loss in CNF system ~250-300 mAh/g with very low capacities ~100-150 mAh/g and ~40-50 mAh/g at low and high current rates, respectively. The contribution of Li intercalation reaction was very low, and CNF showed low capacity to intercalation. The stabilization voltage on intercalation was ~0.25V which is the equilibrium potential for Li-carbon reaction.

Figure 1A:
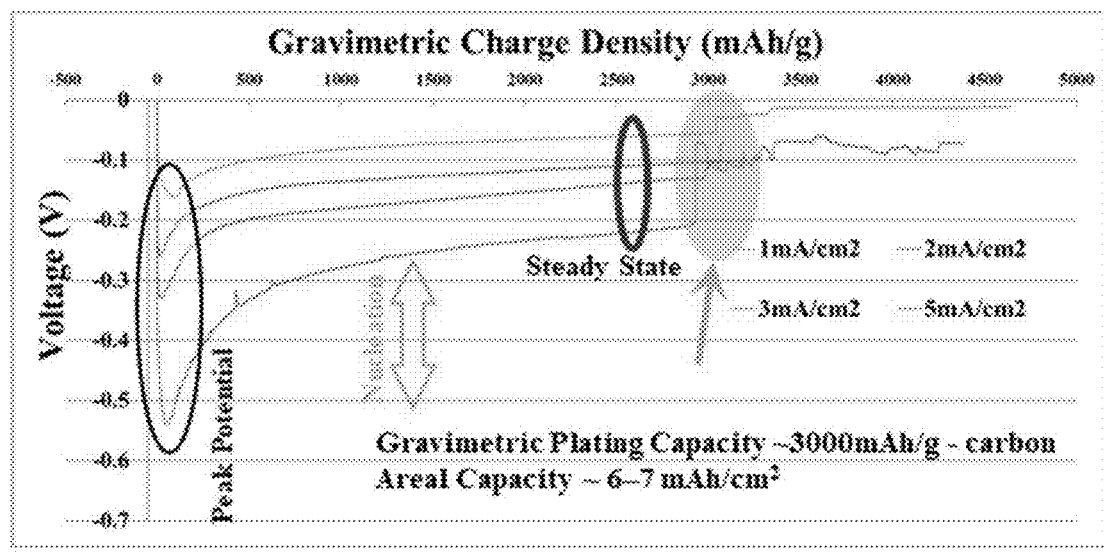
FIG. 1a is a plot that shows stable regime of plating (Sands time experiment) and FIG. 1b is a plot that shows different Li plating potentials with respect to current density, in accordance with certain embodiments of the invention.
Figure 1B:
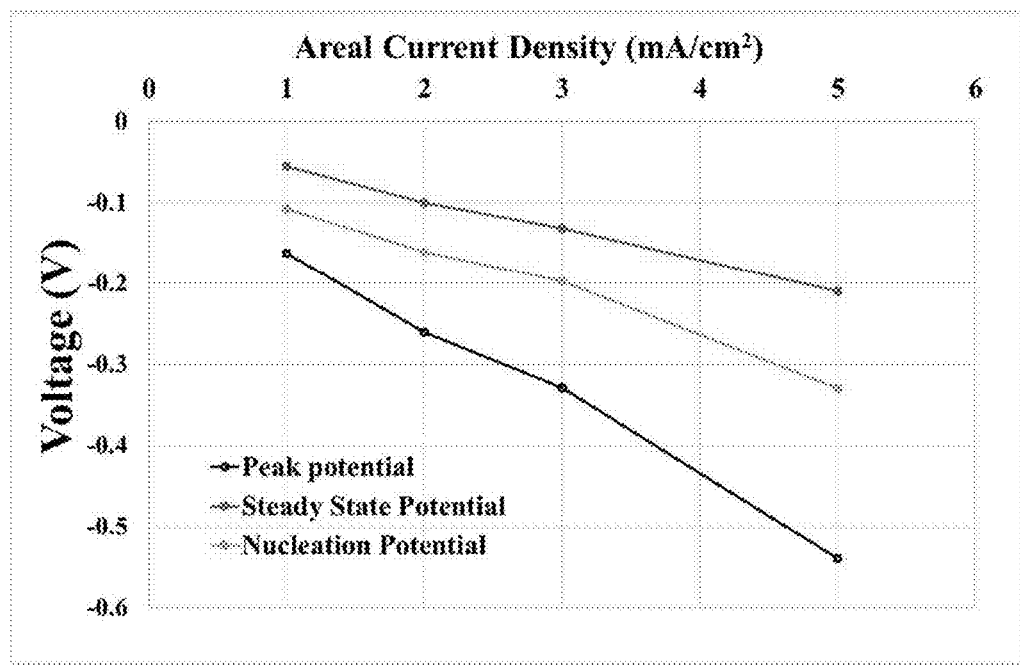

The stable plating regime showed minimal fluctuations before hitting the undesired mossy or fractal Li growth. (See FIGS. 1a and 1b.) This region indicates stable reversible Li plating with the formation of hemispherical growth sites, and coalescence of these structures on CNF. Hence, these CNF based systems are expected to show high CE within this region of plating and deplating. The potential capacity of these CNF based architectures is ~3000 mAh/g w.r.t CNF competing with that of silicon-based anode systems at a gravimetric current rate of ~2 A/g. The systems suffered from an irreversible loss of ~300-350 mAh/g (~10-20%) due to the initial formation/intercalation reaction followed by initial CE fluctuations.

Figure 2A:
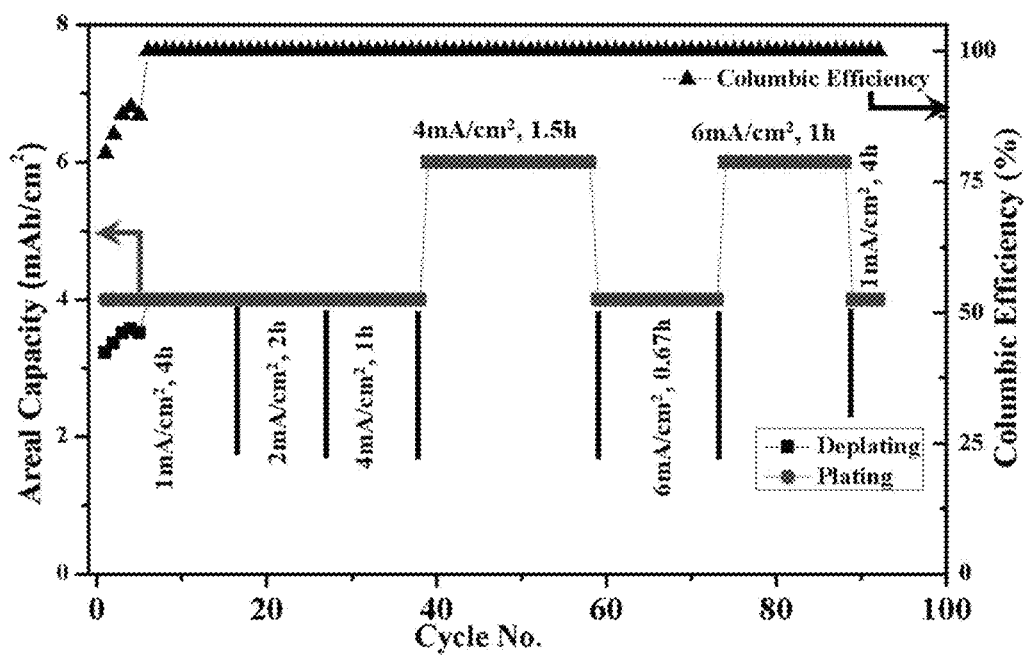
FIG. 2a is a plot that shows rate capability and columbic efficiency of CNF/PDMS-Cu working electrode.
Figure 2B:
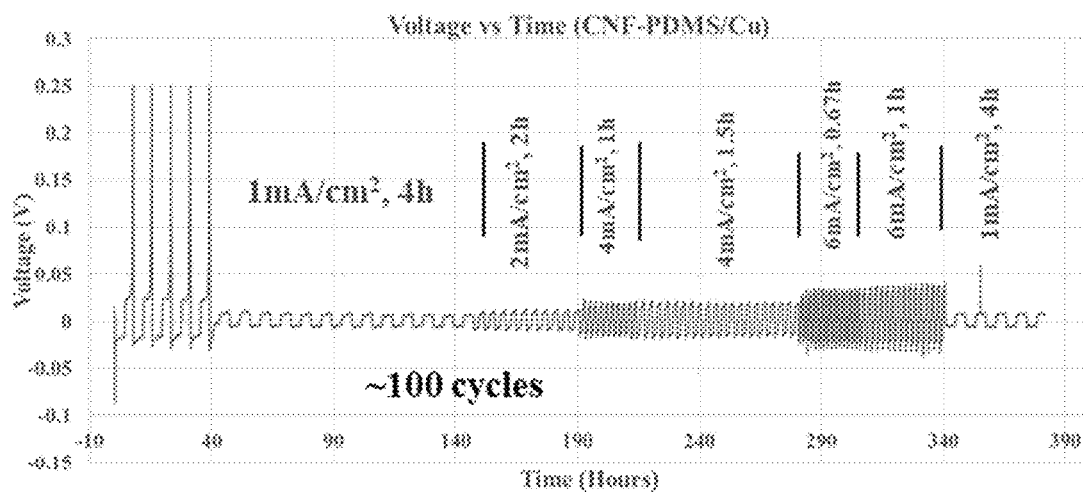
FIG. 2b is a plot that shows voltage profile of working electrode in control channel A.
Figure 2C:
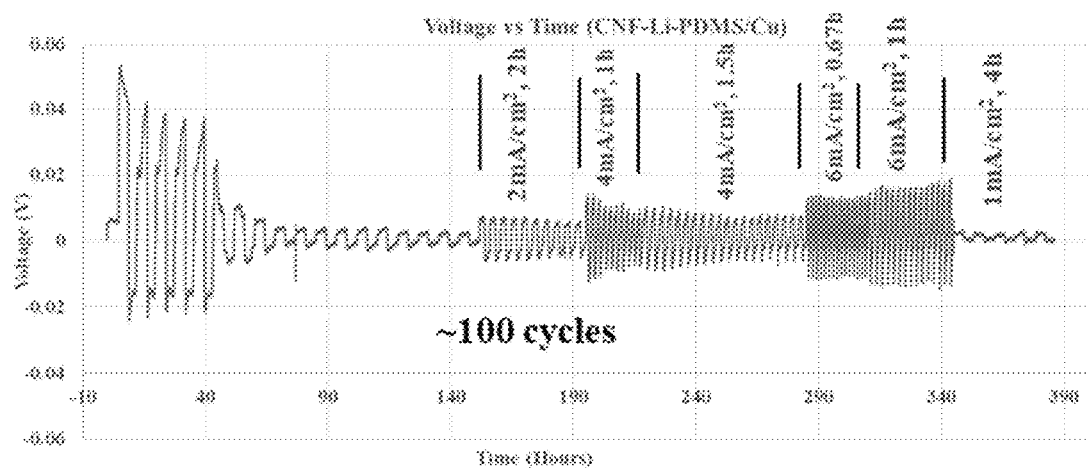
FIG. 2c is a plot that shows voltage profile of counter electrode in channel B, in accordance with certain embodiments of the invention.

In FIGS. 2a, 2b and 2c, Channel A was used to control and set the parameters for plating and deplating evaluation for the working electrode CNF-PDMS/Cu. Channel B was used to monitor the voltage of the counter electrode with respect to the reference lithium. The counter electrode was replaced with Li—CNF-PDMS/Cu instead of plain Li foil to simultaneously check for voltage profile of plating/deplating when Li was melted onto CNF-PDMS/Cu. The voltage profile of CNF-PDMS/Cu (working electrode) and Li/CNF composite (counter electrode) with respect to reference Li showed minimal fluctuations and stable plating and deplating. This test confirmed the stability of Li plating/deplating before moving into coin cell testing.

Figure 3D:
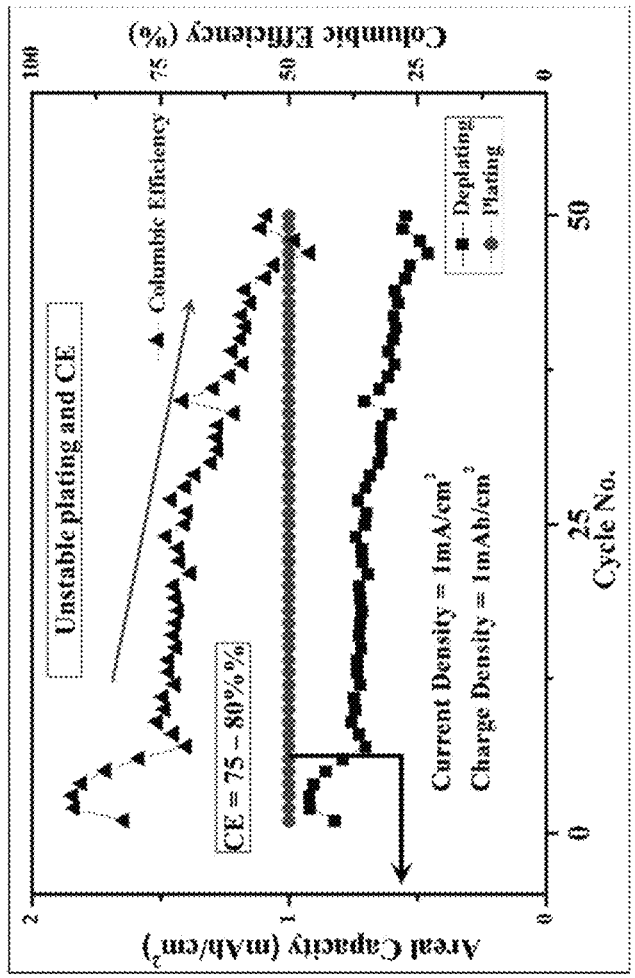
FIG. 3d is a plot that shows electrochemical response for the insulated coin cell testing, in accordance with certain embodiments of the invention.

The traditional coin cell testing employed showed stabilized CE region during initial plating which is due to the spread of Li plating on the working electrode. (See FIG. 3a, 3b). The insulated coin cell testing focused the Li flux to the working electrode (See FIG. 3c, 3d) and hence, the true performance of the system was recorded.

Figure 4B:
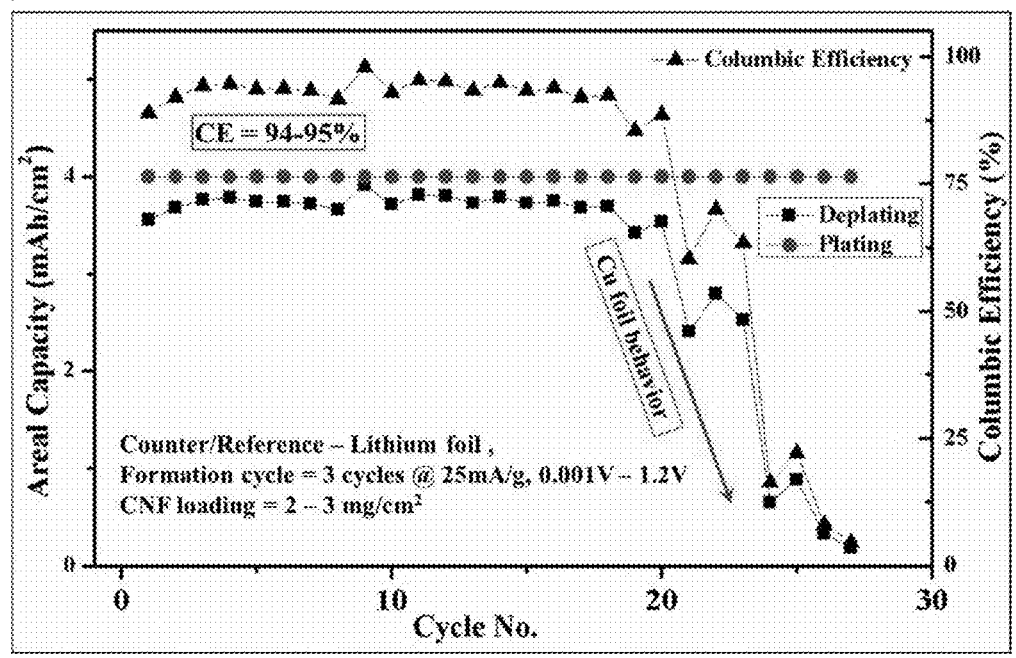

Li plating is associated with porous insulating solid electrolyte interphase (SEI) formation and probability of plating was higher in electron rich region. (See FIGS. 4a and 4b.) Without the PDMS architecture, CNF/Cu showed improved performance as compared to Cu foil due to distribution on lithium plating on Cu and CNF. However, the CNF/Cu cycling profile approached that of Cu foil behavior due to loss of desired electrical contact between Cu foil and CNF (formation of SEI layer/lift-off of CNF) and preferential plating of Li on Cu foil due to the high electron density on Cu foil.

Figure 5B:
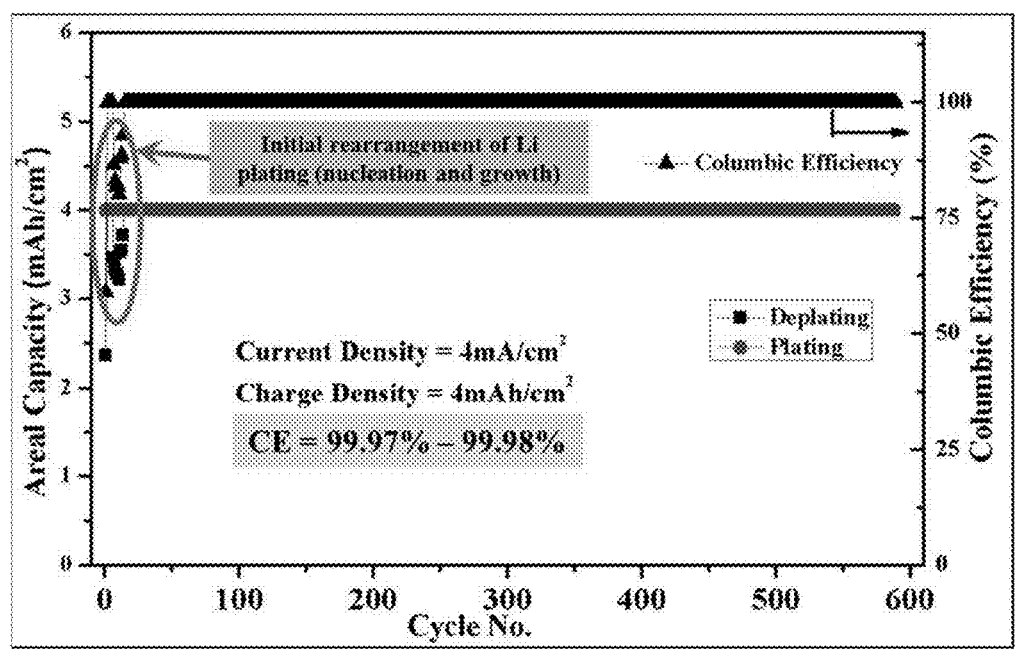

The architecture provides no loss of electrical contact and prevents the lift-off of CNF from copper substrate. (See FIGS. 5a and 5b.) Replacing the Cu foil with CNF effects/adds to the impedance in full cell system depending on the electronic conductivity of the CNF. Hence, CNF-PDMS/Cu architecture provides improved performance and better design.

Figure 6A:
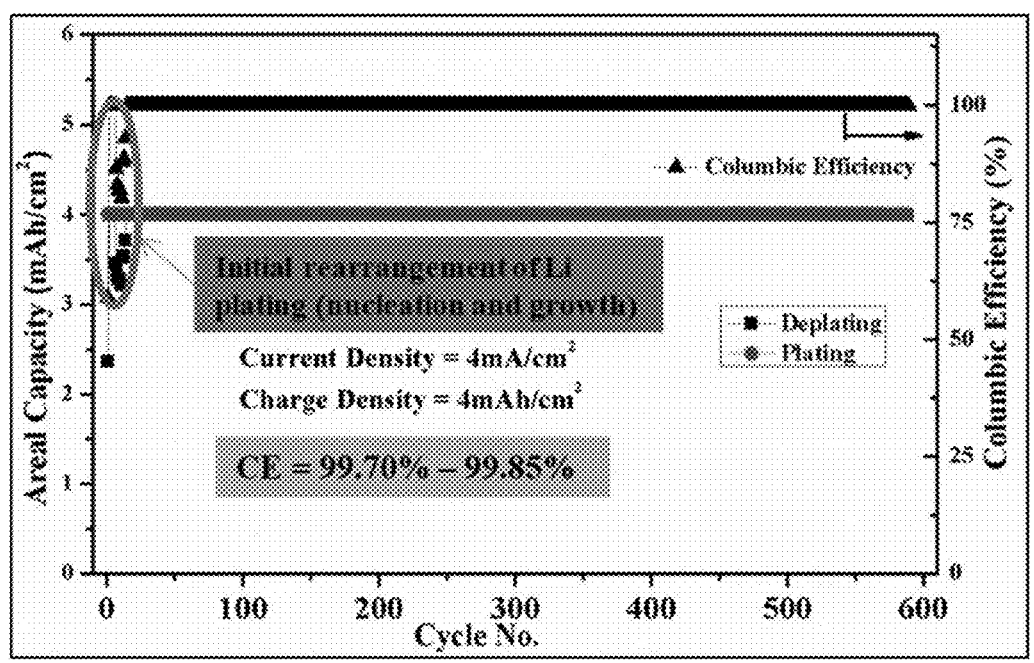
FIG. 6a is a plot that shows long-term testing of CNF-PDMS-Cu and FIG. 6b is a plot that shows rate capability electrochemical testing in insulated coin cell testing, in accordance with certain embodiments of the invention.
Figure 6B:
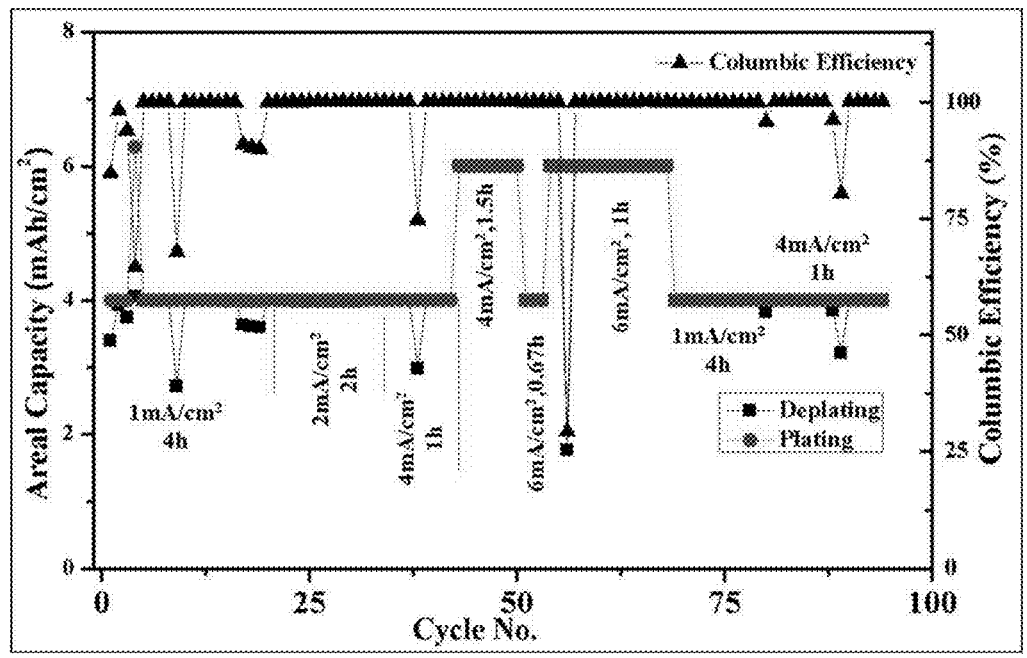

CNF based architecture showed a high columbic efficiency of ~99.70-99.85% for over 600 cycles. The rate capability evaluation showed stable plating efficiency from areal current rates of 1 mA/cm$^2$ to 6 mA/cm$^2$ and areal charge density of 4 mAh/cm$^2$ to 6 mAh/cm$^2$. (See FIGS. 6a and 6b.) The gravimetric specific capacity of the CNF based systems for plating was ~2000-2500 mAh/g based on the areal charge density of plating.

I claim:

1. An electrode architecture, comprising:
    a multi-layer composite structure, comprising:
        a metal-based substrate to form a first layer;
        an elastic polymer that is impervious to lithium applied to or deposited on the metal-based substrate to form a second layer;
        carbon fibers applied to or deposited on the elastic polymer to form a third layer; and
        a point of contact maintained by the carbon fibers directly in contact with the metal-based substrate through the elastic polymer.

2. The electrode architecture of claim 1 wherein the carbon fibers comprise a plurality of carbon nanofibers in a mat form.

3. The electrode architecture of claim 2, wherein the mat is generated by electrospinning followed subsequently by thermal treatment.

4. The electrode architecture of claim 1, wherein the elastic polymer is polydimethylsiloxane.

5. The electrode architecture of claim 1, wherein the metal-based substrate is a copper collector comprising copper foil.

6. The electrode architecture of claim 2, wherein the elastic polymer is applied to a surface of the metal-based substrate, and the plurality of carbon nanofibers in the mat form is pressed onto an outer or exposed surface of the elastic polymer to maintain the point contact directly with the metal-based substrate.

7. The electrode architecture of claim 1, wherein the elastic polymer is selected from the group consisting of silicone-based polymers, carbon-based polymers, higher valence, greater than 3, metal and oxygen—backbone based hydrocarbon polymers, higher valence, greater than 3, metal and phosphorus—backbone based hydrocarbon polymers, higher valence, greater than 3, metal and sulfur—backbone based hydrocarbon polymers, trivalent, tetravalent, pentavalent and higher valence state coordinated metal backbone based hydrocarbon polymers, and mixtures or blends thereof.

8. A dendrite-free, lithium metal-plated anode, comprising the electrode architecture of claim 1, wherein the carbon fibers of the electrode architecture exhibits interfacial adhesion and wetting characteristics to metallic lithium preventing the formation of dendrites.

9. A lithium metal-based lithium ion battery, comprising:
a dendrite-free lithium metal-plated anode, comprising:
a multi-layer composite structure, comprising:
carbon fibers;
an elastic polymer that is impervious to lithium;
a metal-based substrate; and
a point of contact maintained by the carbon fibers directly with the metal-based substrate through the elastic polymer;
liquid and solid electrolytes; and
a cathode selected from the group consisting of a lithium-free cathode and a lithium-containing cathode.

10. A method of preparing an electrode architecture, comprising:
constructing a multi-layer composite structure, comprising:
forming a first layer comprising a metal-based substrate;
forming a second layer comprising an elastic polymer that is impervious to lithium;
applying or depositing the second layer to or on the first layer;
forming a third layer comprising engineered carbon fibers;
applying or depositing the third layer to or on the second layer; and
maintaining a point of contact by the third layer directly with the first layer through the second layer.

11. A method of testing an electrode architecture, comprising:
providing a coin cell metal-based substrate having a length;
providing a working electrode metal-based substrate having a length that is less than the length of the coin cell metal-based substrate;
placing the working electrode metal-based substrate onto the coin cell metal-based substrate;
applying or depositing onto the coin cell metal-based substrate a lithium-impervious, elastic polymer;
positioning the lithium-impervious, elastic polymer on the portion of the length of the coin cell metal-based substrate that extends beyond the length of the working electrode metal-based substrate; and
lithium plating the working electrode metal-based substrate,
wherein the entire length of the coin cell metal-based substrate is protected from the lithium plating.

12. The method of claim 11, wherein the lithium-impervious, elastic polymer is polydimethylsiloxane.

* * * * *